United States Patent [19]

Petersen

[11] Patent Number: 5,430,252
[45] Date of Patent: Jul. 4, 1995

[54] ELECTRICAL FITTING

[76] Inventor: Timothy C. Petersen, 1331 Seabury Cir., Carol Stream, Ill. 60188

[21] Appl. No.: 45,887

[22] Filed: Apr. 14, 1993

[51] Int. Cl.⁶ .......................................... H02G 15/007
[52] U.S. Cl. ................... 174/65 R; 285/252; 285/417
[58] Field of Search ........................... 174/65 R, 84 R; 285/158, 236, 417, 252, 253

[56] References Cited

U.S. PATENT DOCUMENTS

| | | | |
|---|---|---|---|
| 1,800,348 | 4/1931 | Hunter | 174/65 R |
| 2,120,993 | 6/1938 | Selig | 174/65 R |
| 3,268,654 | 8/1966 | Morrison et al. | 285/158 |
| 4,101,151 | 7/1978 | Ferguson | 285/236 |
| 4,927,189 | 5/1990 | Burkit | 285/158 X |

*Primary Examiner*—Leo P. Picard
*Assistant Examiner*—Paramita Ghosh
*Attorney, Agent, or Firm*—Michael I. Kroll

[57] ABSTRACT

An improved electrical fitting is provided in a first embodiment that is a coupling which consists of a housing to receive in each side a distal end of a length of electrical metallic tubing carrying wiring therein. A pair of hose clamps are each built into the housing at each side, so that the distal end of each length of electrical metallic tubing can be retained thereto. A second embodiment that is a connector which consists of a housing to receive in a first side a distal end of a length of electrical metallic tubing carrying wiring therein. A fastener is for connecting a second side of said housing to an electrical junction on a stud box. A hose clamp is built into the housing at the first side, so that the distal end of the length of electrical metallic tubing can be retained thereto.

7 Claims, 2 Drawing Sheets

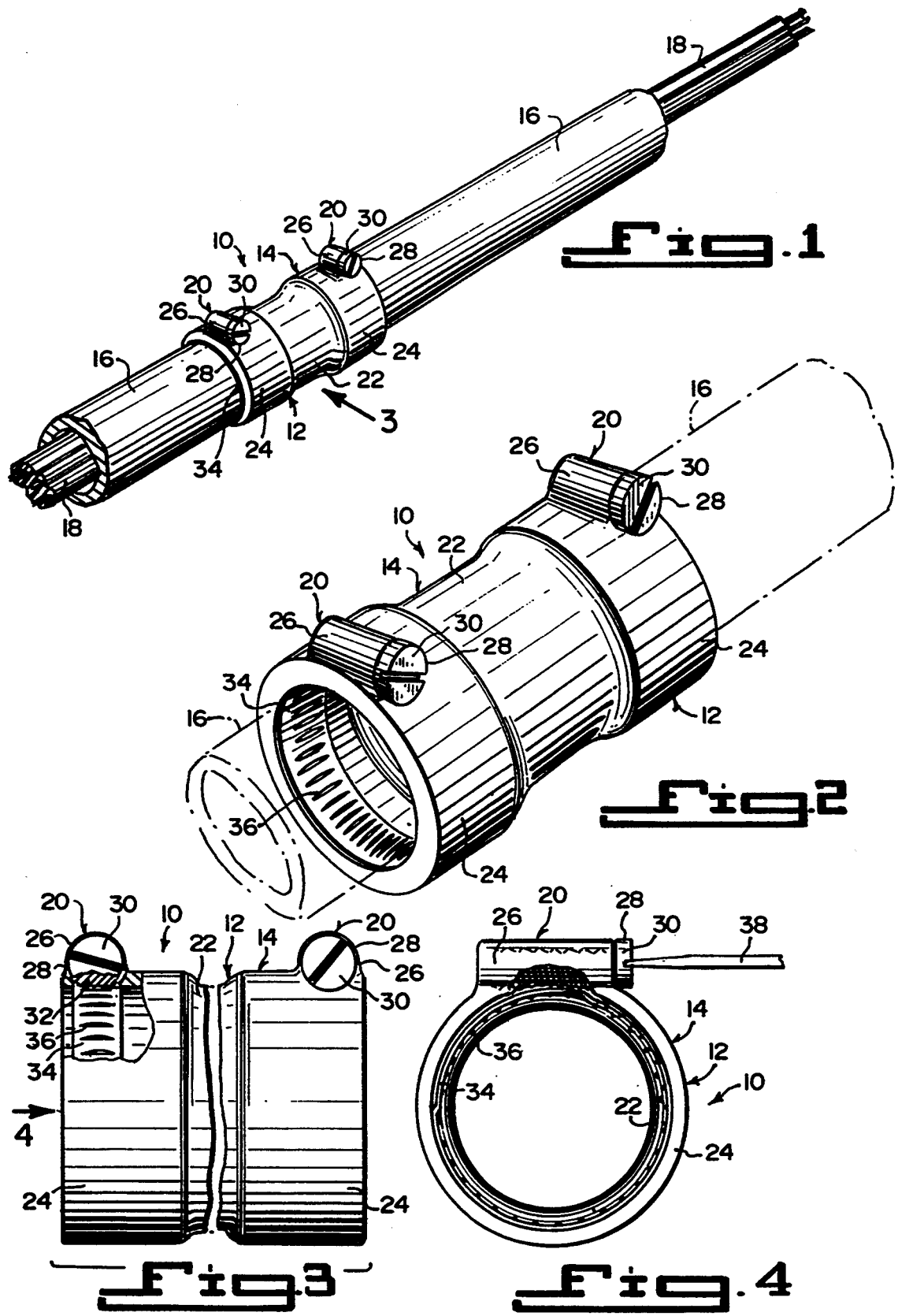

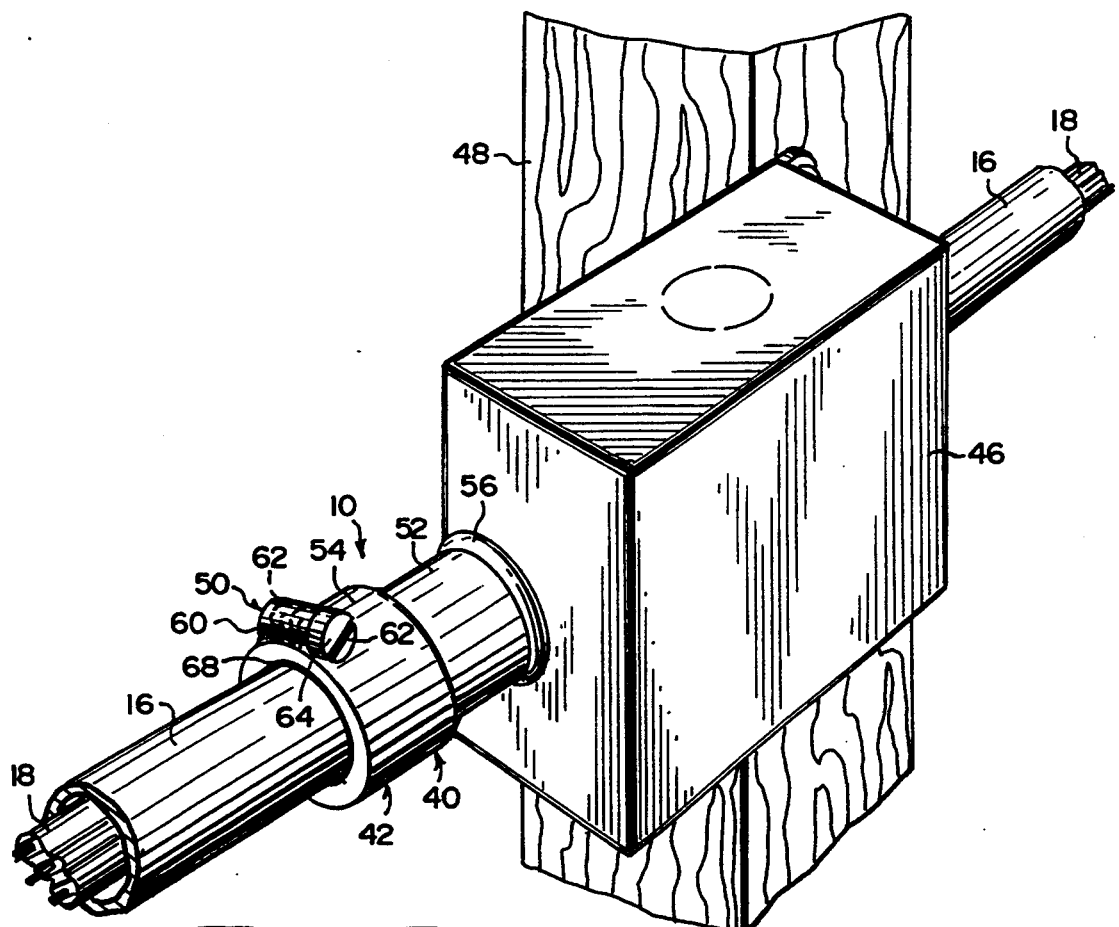
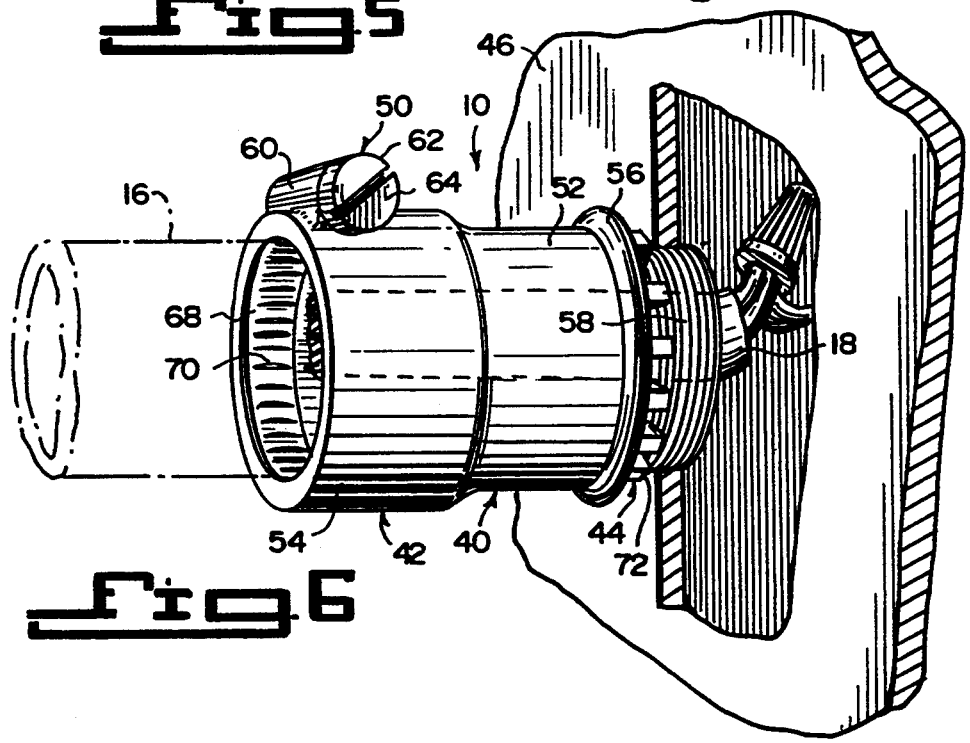

5,430,252

ELECTRICAL FITTING

BACKGROUND OF THE INVENTION

1. Field of the Invention

The instant invention relates generally to conduit fittings for wiring systems and more specifically it relates to an improved electrical fitting.

2. Description of the Prior Art

Numerous conduit fittings for wiring systems have been provided in prior art that include compression type couplings and connectors which require a slip-jaw pliers for installing the couplings and connectors into the wiring systems. While these units may be suitable for the particular purpose to which they address, they would not be as suitable for the purposes of the present invention as heretofore described.

SUMMARY OF THE INVENTION

A primary object of the present invention is to provide an improved electrical fitting that will overcome the shortcomings of the prior art devices.

Another object is to provide an improved electrical fitting in a first embodiment as a coupling containing a built-in hose clamp and in a second embodiment as a connector containing two built-in hose clamps, whereby only one straight-blade screwdriver is needed for installation.

An additional object is to provide an improved electrical fitting in which different diameter sized electrical metallic tubing can be utilized, for the built-in hose clamps are adjustable to grip the electrical metallic tubings.

A further object is to provide an improved electrical fitting that is simple and easy to use.

A still further object is to provide an improved electrical fitting that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of a first embodiment of the instant invention as a coupling connecting two lengths of electrical metallic tubing together.

FIG. 2 is an enlarged perspective view of the first embodiment per se with the electrical metallic tubing shown in phantom.

FIG. 3 is a side view as indicated by arrow 3 in FIG. 1 with parts broken away.

FIG. 4 is an end view as indicated by arrow 4 in FIG. 3 with parts broken away.

FIG. 5 is a perspective view of a second embodiment of the instant invention as a connector connecting the electrical metallic tubing to an electrical junction box.

FIG. 6 is an enlarged perspective view of the second embodiment per se with the electrical metallic tubing shown in phantom and the electrical junction box broken away.

DETAILED DESCRIPTION OF THE PREFERRED EMBODIMENTS

Turning now descriptively to the drawings, in which similar reference characters denote similar elements throughout the several views, FIGS. 1 through 4 illustrate an improved electrical fitting 10 that is a coupling 12 which consists of a housing 14 to receive in each side a distal end of a length of electrical metallic tubing 16 carrying wiring 18 therein. A pair of hose clamps 20, are each built into the housing 14 at each side, so that the distal end of each length of electrical metallic tubing 16 can be retained thereto.

The housing 14 includes a cylindrical hollow sleeve 22 and a pair of enlarged collars 24. Each collar 24 is formed on an opposite side of the sleeve 22, to receive one of the distal ends of one length of electrical metallic tubing 16.

Each hose clamp 20 contains a cylindrical internally threaded enclosure 26 transversely formed onto one of the enlarged collars 24. A bolt 28 having an enlarged slotted head 30 and a threaded shank 32 is threaded into the enclosure 26. An adjustable band 34 is provided having a plurality of depressions 36 thereacross to engage with the threaded shank 32 of the bolt 28. When the enlarged slotted head 30 of the bolt 38 is turned in one direction by a straight-blade screwdriver 38, the adjustable bland 34 will grip the distal end of the length of electrical metallic tubing 16. When the enlarged slotted head 30 of the bolt 28 is turned in an opposite direction by the straight-blade screwdriver 38, the adjustable band 34 will release the distal end of the length of the electrical metallic tubing 16. The housing 14 is fabricated out of stainless steel and each hose clamp 20 is also fabricated out of stainless steel.

The improved electrical fitting 10, as shown in FIG. 5 and 6, is a connector 40 which consists of a housing 42 to receive in a first side a distal end of a length of electrical metallic tubing 16 carrying wiring 18 therein. A fastener 44 is for connecting a second side of the housing 42 to an electrical junction box 46 on a stud 48. A hose clamp 50 is built into the housing 42 at the first side, so that the distal end of the length of electrical metallic tubing 16 can be retained thereto.

The housing 42 includes a cylindrical hollow sleeve 52. An enlarged collar 54 is formed on a first side of the sleeve 52, to receive the distal end of the length of electrical metallic tubing 16. A ring 56 with an externally threaded end 58 is formed on a second side of the sleeve 52 to enter an aperture in the electrical junction box 46.

The hose clamp 50 contains a cylindrical internally threaded enclosure 60 transversely formed onto the enlarged collar 54. A bolt 62 having an enlarged slotted head 64 and a threaded shank 66 is threaded into the enclosure 60. An adjustable band 68 is provided having a plurality of depressions 70 thereacross to engage with the threaded shank 66 of the bolt 62. When the enlarged slotted head 64 of the bolt 62 is turned in one direction by a straight-blade screwdriver 38, the adjustable band 68 will grip the distal end of the length of electrical metallic tubing 16. When the enlarged slotted head 64 of the bolt 62 is turned in an opposite direction by the straight-blade screwdriver 38, the adjustable band 68 will release the distal end of the length of electrical metallic tubing 16.

The connecting fastener 44 is a lock nut 72 which threads onto the externally threaded end 58, after the externally threaded end 58 enters the aperture in the electrical junction box 46, so that the ring 56 will bear against the electrical junction box 46. The housing 42, hose clamp 50, and the lock nut 72 are all fabricated out of stainless steel.

OPERATION OF THE INVENTION

To use the coupling 12, in FIGS. 1 through 4, a person simply places the distal ends of the two lengths of electrical metallic tubing 16 into the enlarged collars 24. The straight-blade screwdriver 38 can then turn each of the enlarged slotted heads 30 of the bolts 28, until the adjustable bands 34 grip the distal ends.

To use the connector in FIGS. 5 and 6, a person simply places the externally threaded end 58 into the aperture in the junction box 46. The lock washer 72 is then tightened onto the externally threaded end 58, so that the ring 56 bears against the junction box 46. The distal end of the length of electrical metallic tubing 16 is placed into the enlarged collar 54. The straight-blade screwdriver 38 can then turn the enlarged slotted head 64 of the bolt 62 until the adjustable band 68 grips the distal end.

LIST OF REFERENCE NUMBERS 10 improved electrical fitting
12 coupling for 10
14 housing
16 electrical metallic tubing
18 wiring in 16
20 hose clamp in 14
22 cylindrical hollow sleeve in 14
24 enlarged collar on 22
26 cylindrical internally threaded enclosure
28 bolt
30 enlarged slotted head of 28
32 threaded shank of 28
34 adjustable band
36 depression in 34
38 straight-blade screwdriver
40 connector for 10
42 housing
44 connecting fastener on 42
46 electrical junction box
48 stud
50 hose clamp in 42
52 cylindrical hollow sleeve in 42
54 enlarged collar on 52
56 ring on 52
58 externally threaded end on 52
60 cylindrical internally threaded enclosure
62 bolt
64 enlarged slotted head of 62
66 threaded shank of 62
68 adjustable band
70 depression in 68
72 lock nut for 44

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An improved electrical coupling for electrical metallic tubing carrying wiring therein comprising:
   a) a housing of metallic construction to receive in each side a distal end of a length of electrical metallic tubing carrying wiring therein, said housing including a cylindrical hollow sleeve and a pair of enlarged collars, each formed on an opposite side of said sleeve to receive one of the distal ends of one length of electrical metallic tubing; and
   b) a pair of hose clamps, each built into said housing at each side on said collars, so that the distal end of each length of electrical metallic tubing can be retained thereto, each hose clamp including a cylindrical internally threaded enclosure transversely formed onto one of said enlarged collars, a bolt having an enlarged slotted head and a threaded shank threaded into said enclosure, and an adjustable band having a plurality of slots thereacross to engage with said threaded shank of said bolt, so that when said enlarged slotted head of said bolt is turned in one direction by a straight-blade screwdriver, said adjustable band will grip the distal end of the length of electrical metallic tubing and when said enlarged slotted head of said bolt is turned in an opposite direction by the straight-blade screwdriver, said adjustable band will release the distal end of the length of electrical metallic tubing.

2. An improved electrical coupling as recited in claim 1, wherein said housing is fabricated out of stainless steel.

3. An improved electrical coupling as recited in claim 2, wherein each said hose clamp is fabricated out of stainless steel.

4. An improved electrical fitting being a connector for use with an electrical junction box which comprises:
   a) a housing to receive in a first side a distal end of a length of electrical metallic tubing carrying wiring therein, said housing including a cylindrical hollow sleeve and an enlarged collar of larger diameter than said sleeve formed on a first side of said sleeve to receive the distal end of the length of electrical metallic tubing;
   b) means for connecting a second side of said housing to an electrical junction box on a stud comprising a ring with an externally threaded end formed on a second side of said sleeve to enter an aperture in said electrical junction box;
   c) a hose clamp built into said housing at the first side, so that the distal end of the length of electrical metallic tubing can be retained thereto, said hose clamp including a cylindrical internally threaded enclosure transversely formed onto said enlarged collar, a bolt having an enlarged slotted head and a threaded shank threaded into said enclosure, and an adjustable band having a plurality of slots thereacross to engage with aid threaded shank of said bolt, so that when said enlarged slotted head of said bolt is turned in one direction by a straight-blade screw driver, said adjustable band will grip the distal end of the length of electrical metallic tubing and when said enlarged slotted head of said bolt is turned in an opposite direction by the straight-blade screwdriver, said adjustable band will release the distal end of the length of electrical metallic tubing; and d) said connecting means including a lock nut which threads onto said externally threaded end, after said externally threaded end enters the aperture in the electrical junction box, so that said ring will bear against the electrical junction box.

5. An improved electrical fitting as recited in claim 4, wherein said housing is fabricated out of stainless steel.

6. An improved electrical fitting as recited in claim 5, wherein said hose clamp is fabricated out of stainless steel.

7. An improved electrical fitting as recited in claim 6, wherein said lock nut is fabricated out of stainless steel.

* * * * *